(12) United States Patent
Osenbach et al.

(10) Patent No.: US 6,195,191 B1
(45) Date of Patent: Feb. 27, 2001

(54) OPTICAL DEVICES HAVING IMPROVED TEMPERATURE STABILITY

(75) Inventors: John William Osenbach, Kutztown; William James Minford, Northampton; Douglas A. Herr, Lancaster, all of PA (US); Henry Miles O'Bryan, Plainfield; Allan James Bruce, Scotch Plains, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/377,091

(22) Filed: Aug. 19, 1999

(51) Int. Cl.⁷ .................................................. G02B 26/02
(52) U.S. Cl. ......................... 359/238; 359/322; 359/248
(58) Field of Search ................................. 359/322, 321, 359/248, 245, 238

(56) References Cited

U.S. PATENT DOCUMENTS

| | | | |
|---|---|---|---|
| 4,093,345 | * 6/1978 | Logan et al. | 350/355 |
| 5,841,568 | * 11/1998 | Miyakawa | 359/245 |
| 5,958,644 | * 9/1999 | Ueda et al. | 430/128 |
| 6,014,241 | * 1/2000 | Winter et al. | 359/245 |

* cited by examiner

Primary Examiner—Georgia Epps
Assistant Examiner—Timothy Thompson
(74) Attorney, Agent, or Firm—Duane Morris and Heckscher LLP

(57) ABSTRACT

Optical devices using non-centric crystals, such as lithium niobate, and methods for making and using the devices, are provided. The devices provide improved temperature stability as compared to conventional devices using non-centric crystals. The improved temperature stability is provided by etching the surface of a non-centric crystal to a depth of less than about 300 angstroms. The devices and methods of the invention reduce the magnitude of change in bias voltage required to maintain an optical crystal at a pre-selected operating point.

30 Claims, 2 Drawing Sheets

OPTICAL DEVICES HAVING IMPROVED TEMPERATURE STABILITY

FIELD OF THE INVENTION

The present invention relates to optical devices using pyroelectric non-centric crystals.

DESCRIPTION OF THE RELATED ART

Non-centric crystals are of use in making electro-optic devices. Some non-centric crystals, such as, for example, lithium niobate, are also pyroelectric. Pyroelectricity is a property of crystals whereby the polarization of the crystal changes when its temperature changes. The change in polarization in turn produces a self-induced electric field. For example, a temperature change of 100° C. can result in an electric field at the surface of a lithium niobate crystal of about $10^7$ volts/centimeter (V/cm). Such an electric field can interfere with the operation of optical devices, reducing their usefulness in applications where temperature fluctuations are expected.

The effect of temperature change on the crystals can be controlled by cooling, such as, for example, by the use of thermoelectric coolers. However, the use of such coolers can be limited, because optical crystals are also often piezoelectric. Piezoelectricity means that the application of a mechanical stress to an optical crystal can effect its polarization. Thus, assembling piezoelectric crystals with thermal electric coolers can create mechanical stresses which can aggravate or complicate the pyroelectric effect. Thermal expansion mismatches between the crystal, the cooler, and any material used to attach the crystal to the cooler, can increase the mechanical stresses placed on the crystal.

Another method for controlling the effect of temperature changes on a crystal in an optical device is by the application of a resistive field shield to both sides of the device, thereby uniformly terminating the self-induced electric field. A field shield is generally provided by a dissipation layer, which includes a film, of about 800 angstroms in thickness, of a moderately conducting material such as silicon titanium nitride or indium tin oxide. The film serves to remove pyroelectric charges from the surface of the crystal. A bias voltage is applied to maintain the operation of the crystal. However, the effectiveness of a resistive field shield can degrade over time on some optical devices, and the bias voltage required to maintain operation of the crystal varies with temperature. The magnitude of the change is dependent upon the time for which the bias voltage is being applied.

Improved methods for controlling the effect of temperature on the operation of pyroelectric non-centric crystals are desired.

SUMMARY OF THE INVENTION

One aspect of the present invention is a method for reducing the undesired effects of pyroelectricity on optical devices that include non-centric crystals. The method includes etching the surface of an optical crystal to a depth of less than about 300 angstroms. An optical device may include a waveguide, a dielectric buffer layer, a dielectric field shield on the buffer layer, and one or more metal electrodes. The buffer layer may contain a dopant material, such as indium oxide ($In_2O_3$), which may be contained in a matrix of silicon dioxide ($SiO_2$).

In preferred embodiments, the surface of the crystal is etched to a depth of about 275 angstroms or less. Even more preferably, the depth of the etching is about 250 angstroms or less. Also in preferred embodiments, the etched surface of the crystal has a surface defect density of about $5 \times 10^{16}$ defects per square centimeter, more preferably less than about $1 \times 10^6$ defects per square centimeter.

The crystal may be of lithium niobate, barium titanate, lead titanate, potassium lithium niobate, or calcium niobate. Lithium niobate is preferred.

Another aspect of the present invention is an optical device comprising a pyroelectric non-centric crystal having an etched surface and a voltage source for applying a bias voltage to said device, wherein the depth of said etching into said surface is less than about 300 angstroms.

In preferred embodiments, the crystal has a surface defect density of less than about $5 \times 10^6$ defects per square centimeter. A bias voltage may be variably applied as required to maintain the operation of the optical device. Preferably, the bias voltage varies by less than about 1 volt corresponding to a temperature change of about 70 degrees C. In certain highly preferred embodiments, the bias voltage may vary by less than about 0.7 volt, or even less than about 0.5 volt.

The optical devices of the invention can have an optical modulator operable to modulate an input light wave, according to an input signal, at an operating point which is determined by a bias voltage. The optical devices may also include a detector that detects a deviation of the operating point from a selected optimal operating point, based on an output of the optical modulator. Also, the devices of the invention may include a bias generating means for generating said bias voltage within a predetermined voltage range of bias voltages so as to reduce deviation from the selected optimal operating point.

In some embodiments, the devices of the invention include a means for setting the bias voltage at a predetermined voltage associated with the determined operating point when the optical modulator is initialized. The optical modulator may modulate the input light wave according to the input signal as a predetermined voltage is set as the bias voltage. The predetermined voltage generally varies by less than about 1 volt corresponding to a temperature change of about 70 degrees C. In preferred embodiments, the optical device includes a lithium niobate crystal. Preferably, the crystal has a buffer layer that includes indium oxide. Also preferably, the device includes a charge dissipation layer made of a moderately conducting material such as silicon titanium nitride. The silicon titanium nitride can comprise silicon, titanium and nitride in varying ratios and its composition can be represented by the formula $Si_2Ti_xN_{(8/3)+x}$ wherein x is an integer. The device also preferably includes electrodes that can transmit an electrical signal to the device. The electrodes are made from a conducting metal such as, for example, copper or gold, and are preferably made from gold.

A further aspect of the invention is a method of manufacturing an optical device. The method includes the steps of:

providing a non-centric electro-optic crystal;

forming a waveguide in the non-centric electro-optic crystal;

etching the surface of the crystal to a depth of less than about 300 angstroms;

depositing a buffer layer onto the etched surface of the crystal;

forming a charge dissipation layer on the buffer layer; and attaching one or more electrodes to the crystal.

In preferred embodiments, the etched surface of the crystal has a surface defect density of less than about $5 \times 10^6$ defects per square centimeter.

In some embodiments, such as, for example, when the electro-optic crystal is a X-cut lithium niobate crystal, a buffer layer may not be used. It is to be understood that such devices not having a buffer layer are within the scope of the present invention.

BRIEF DESCRIPTION OF THE DRAWINGS

FIG. 1a shows a planar view of the modulator with waveguides only. FIG. 1b shows a planar view of the modulator with waveguides and electrodes. FIG. 1c shows a cross-sectional view of the modulator. FIG. 1d shows the electric field distribution through the waveguide when a bias voltage is applied to the hot electrodes. FIG. 1e shows a graphic representation of output of the device as a function of applied voltage.

FIG. 2a shows a planar view of the attenuator, with waveguide only. FIG. 2b shows a planar view of the attenuator with waveguide and electrodes. FIG. 2c shows a cross-sectional view of the attenuator. FIG. 2d shows the electric field distribution through the attenuator when a bias voltage is applied to the electrodes. FIG. 2e shows a graphic representation of output of the attenuator as a function of applied voltage.

DETAILED DESCRIPTION

Figure 1A:
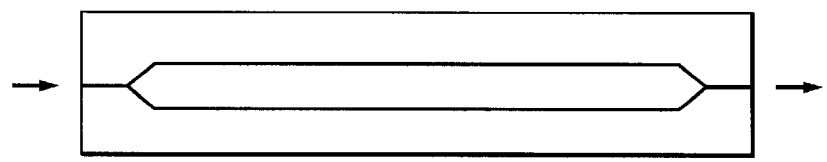
FIGS. 1a–1e show a lithium niobate modulator.

The present inventors have found that the temperature sensitivity of the operating point of optical devices made of pyroelectric non-centric crystals can surprisingly and unexpectedly be controlled by etching the surface of a non-centric crystal to a lesser depth than is the general practice in the art. In particular, it has been found that by etching the surface of a pyroelectric non-centric crystal to a depth of less than about 300 angstroms after formation of a waveguide on the crystal and prior to the deposition of a buffer layer, the magnitude of the change in bias voltage needed to maintain a crystal at a pre-selected operating point during a temperature change of about 70° C. can be less than about 1 volt, even less than about 0.7 volt. The change in bias voltage is reduced even more by etching to a depth of about 275 angstroms or less, and even more by etching to a depth of about 250 angstroms or less. For example, by etching the surface of the crystal to a depth of about 250 angstroms or less, the change in bias voltage required to maintain a pre-selected operating point of a crystal can be less than about 0.5 volt.

The inventors have further found that, when the change in bias voltage is less than about 0.5 volts according to the methods of the invention, adverse effects of applied bias voltage on the continued performance of the crystal can be reduced. As an illustration of such adverse effects, an optical device operated with a change in bias voltage of 0.5 volts or less can have a lifetime of about 20 years or more, whereas the same device operating with a change in bias voltage of about 2 volts can have a lifetime of less than about 15 years.

Methods for etching pyroelectric crystals are known to those skilled in the art. Etching techniques are described in ULSI Technology, C. Y. Chang and S. M. Sze, McGraw-Hill, New York (1996), pp. 329–369, and "Ferroelectric Lithium Niobate 1: Growth, Domain Structure, Dislocations and Etching", K. Nassau et al., J Physics and Chemistry of Solids vol. 27, pp. 993–1026 (June-July 1966), the entire disclosures of both of which are hereby incorporated herein by reference in their entirety. Common techniques include wet chemical etching, plasma etching, and reactive ion etching. Wet chemical etching is preferred. Methods and materials for use in wet chemical etching are described on pp. 364–366 of ULSI Technology, already incorporated by reference, and in Silicon Processing for the VLSI Era, S. Wolf and R. N. Tauber, Vol. 1, Lattice Press, CA (1986), pp. 529–535, the disclosures of which are hereby incorporated herein by reference in their entirety.

Many of the chemicals used for etching, also referred to as "etchants", are chemicals that can be classified as redox reagents. Redox reagents, which can be, for example, acids or bases, effect a change in oxidation state in materials with which they react. The reagents are generally provided in solution, such as an aqueous solution. Other agents may be present, such as hydrogen peroxide. Alkaline etchants include ammonium hydroxide, tetramethyl hydroxide, potassium hydroxide and sodium hydroxide. An example of an alkaline etching solution is an aqueous solution of ammonium hydroxide and hydrogen peroxide. For example, in about 7–8 liters of water, preferred amounts of ammonium hydroxide are about 200–300 ml and preferred amounts of hydrogen peroxide are about 700–800 ml. Acids suitable for use as etchants, alone or in combination, include nitric acid, hydrofluoric acid, acetic acid, and phosphoric acid. Acids may optionally be buffered; for example, hydrofluoric acid can be used as a combined solution, in a ratio of 6:1 by volume, of 40% $NH_4F$ solution and 49% HF solution. Other components may be present in solution with an acid, such as, for example, chromium oxides, and chromates including potassium dichromate.

Solutions used in chemical etching of crystals may used at room temperature, or may be heated. The appropriate temperature depends upon a number of factors, including the desired etch rate, and the composition of the chemical etching solution and of the substrate, as will be apparent to those skilled in the art. Temperature ranges suitable for many chemical etching processes are within the range of about 80° C.–125° C., typically about 85°–95° C., preferably about 85° C., although temperatures outside these ranges can be used. The temperature may affect the rate of etching, and can be varied in order to control the etch rate along with other parameters such as etchant composition and concentration. In addition, the pH of an etching solution will depend upon the composition of the chemical etching solution.

Non-centric crystals for which the methods of the present invention can be used include $LiNbO_3$, $LiTaO_3$, $BaTiO_3$, $PbTiO_3$, $K_2Li_2Nb_5O_{15}$ and $CaNb_2O_7$. $LiNbO_3$ is preferred.

Non-centric crystals for use in optical devices according to the exemplary embodiments of the invention will generally include a waveguide. The waveguide functions to guide the propagation of electromagnetic waves through the device, and generally includes parallel wires which serve as electrodes, and an central ground electrode. A waveguide can be formed by, for example, deposition of a metal such as titanium from a titanium diffusion, in a technique known as "thermal diffusion". The technique includes depositing a layer of titanium, generally less than 1 nm in thickness, onto the surface of the crystal by electron beam deposition, followed by heating so that the titanium thermally diffuses into the crystal, forming a path through the crystal.

Other methods for forming a waveguide, such as proton exchange are well known to those skilled in the art. Proton exchange in a lithium niobate crystal can be accomplished, for example, by submerging the crystal into a sulfuric acid solution. The proton exchange can be limited to a selected area by, for example, using a mask. In the submerged region that is exposed to the acid solution, lithium ions are replaced by hydrogen ions, creating a region that is lithium deficient with respect to the rest of the crystal. The lithium deficient region has a higher refractive index than the rest of the crystal.

Formation and composition of waveguides are described in U.S. Pat. No. 5,526,448, the disclosure of which is hereby incorporated herein by reference in its entirety.

A buffer layer may be deposited onto the waveguide. Methods for depositing the buffer layer include electron beam deposition and sputtering. The buffer layer may be a dielectric film that appears transparent to the eye, having a lower refractive index than the waveguide. The buffer layer serves to prevent light propagating through the waveguide from being absorbed by the electrodes, and is sandwiched between the waveguide and the electrodes. The buffer layer generally contains one or more metals of Group IIIA, i.e. boron, aluminum, gallium, indium or tellurium. The metal can be in the form of an oxide, such as indium oxide ($In_2O_3$) or silicon dioxide ($SiO_2$). Alternatively, the buffer layer may be made of one material contained within another, the former material being present at a concentration of about 5 mol percent or less of the total buffer layer material, and generally referred to as a "dopant". For example, the buffer layer can be made of silicon dioxide containing 5 mol % of indium oxide. Other compounds that can be used include oxides of other metals such as germanium oxide, titanium oxide, tin oxide, and zinc oxide. Suitable compositions for buffer layers are described in European patent application EP 0,553,568 A1, which is incorporated herein by reference in its entirety. The desired thickness of the buffer layer is determined by a balance of properties desired in the buffer layer. The thicker the buffer layer, generally the higher the voltage required to operate the device. The thinner the buffer layer, the greater the likelihood of absorption loss of light. Preferably, the thickness of the buffer layer will be at least about 300 nanometers. Also preferably, the thickness of the buffer layer will be about 1.5 micrometers or less, more preferably about 1.4 micrometers or less, and even more preferably about 1 micrometer or less.

Figure 1B:
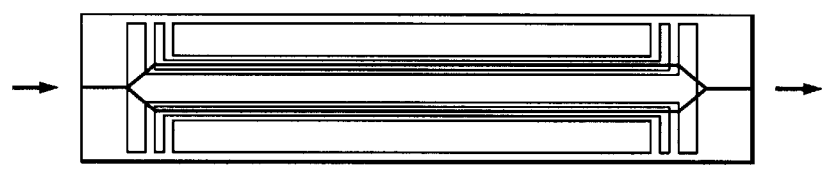
Figure 1C:
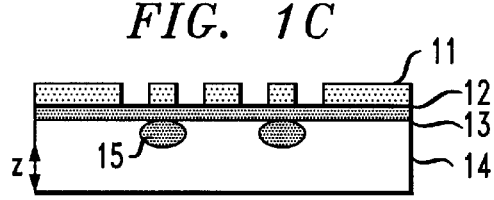

As mentioned above, in some crystals, a buffer layer may not be used. For example, a buffer may not be required for a X-cut lithium niobate crystal. Non-centric crystals may be cut in a variety of ways. In a Z-cut crystal, if the axes of the crystal are as shown in FIGS. 1(c) and 2(c), the Z-axis is perpendicular to the plane of surface of the crystal in which the waveguides are located, which plane is referred to as the Z plane in a Z-cut crystal, and an electric field is applied along the Z-axis of the crystal by applying electrodes to the cut surface of the crystal. A buffer layer on the surface separates the electrodes from the waveguides, preventing attenuation of light traveling through the waveguides. In a X-cut crystal, if an electric field were applied along the Z-axis, the electrodes would straddle the waveguide, and there would be no attenuation of light traveling through the waveguide.

Exemplary dimensions of a commercially available optical device made from a lithium niobate crystal are about 5 inches×½ inch×½ inch, and the crystal in such a device will typically be about 2.5 inches×⅟16 inch×4/100 inch. In such a device, a waveguide will typically have dimensions of about 2.5 inches×10 microns×4 microns.

In operation of an optical device, an electric field is applied to the optical waveguide using the electrodes, which changes the refractive index of the waveguide in proportion to the intensity of the applied electric field. This provides switching and modulation of optical signals. The field at which the optical device operates desirably, or preferably optimally, is called its "operating point". When a bias voltage is applied as described above, to control thermal effects, the operating point can vary. In order to avoid a corresponding variation in the operation of the device, a feedback control circuit may be provided with an optical device such as a modulator or attenuator. The feedback control circuit monitors deviations in the operating point from the optimal operating point by monitoring the output signal, e.g., output light, of the optical device, and controls the bias voltage so as to operate the optical modulator at the optimal operating point. Optical devices, particularly modulators, operated with feedback control circuits are described in U.S. Pat. No. 5,742,268, the disclosure of which is hereby incorporated herein by reference in its entirety.

The present invention provides further improvement in the control of the operation of optical devices by reducing the change in bias voltage required to operate an optical device at a predetermined operating point. While it is not intended that the invention be bound by any theory, it had been observed that the methods and devices of the invention provide reduced surface defect density as compared with conventional optical devices utilizing pyroelectric non-centric crystals, when viewed by an optical microscope at 200–500× magnification or a scanning electron microscope at 100–500× magnification. In particular, it has been observed for a lithium niobate crystal with a waveguide formed by titanium diffusion, that etching the surface of the crystal to a depth less than about 300 angstroms resulted in surface defect densities of about $10^7/cm^2$ or less. Furthermore, etching of the same type of crystal to a depth of 250 angstrom resulted in surface defect densities of $10^6$ to $10^7/cm^2$. In contrast, when the crystal was etched to a depth of 375 angstrom, surface defect densities of $10^7$ to $10^8/cm^2$ were observed, and when the etching depth was 500 angstroms, surface defect densities of 10 to $10^9/cm^2$ were observed.

Examples of optical devices for which the methods and devices of the present invention are useful include optical switches, modulators, polarizers, attenuators and the like. Modulators function to vary the amplitude, frequency, or phase of a wave such as a light wave. Attenuators function to reduce the amplitude of a wave.

Figure 1D:
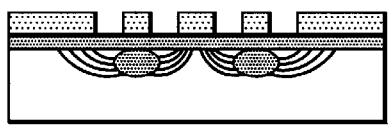
Figure 1E:
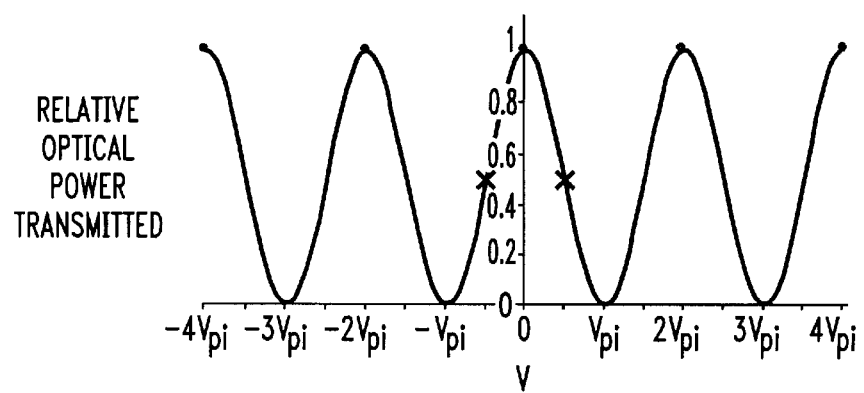

The invention is now further described with reference to the accompanying figures. The arrows in the figures indicate the direction of propagation of light. FIGS. 1a–1e show a lithium niobate modulator. FIG. 1a shows a planar view of the modulator with waveguides only, and FIG. 1b shows a planar view of the modulator with waveguides, with two "hot" electrodes and a center ground electrode. In some embodiments, the electrodes are "dual drive electrodes", i.e., the voltage in each electrode can be independently controlled. Dual drive electrodes are described in U.S. Pat. No. 5,303,079, the disclosure of which is hereby incorporated herein by reference in its entirety. FIG. 1c shows a cross-sectional view of the modulator, with the electrodes, charge dissipation layer, buffer layer, and optical modes illustrated. FIG. 1d shows the electric field distribution through the waveguide when a bias voltage is applied to the hot electrodes. FIG. 1e shows a graphic representation of output of the device as a function of applied voltage. The points marked with an "X" are optimal operating points for the modulator. The bias voltage affects the refractive index of the waveguides, so that by varying the applied voltage to one waveguide while maintaining a constant voltage, or no voltage, applied to the other waveguide, the output signal can be varied due to the variation in the constructive or destructive interference between the two waveguides. Typical operating points for lithium niobate modulators are from about 2 volts to about 10 volts.

Figure 2A:
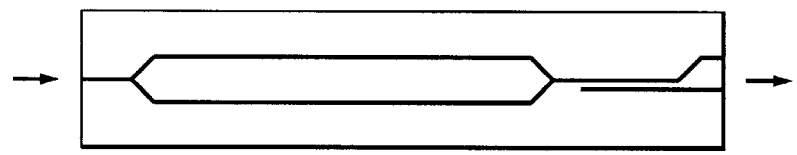
FIGS. 2a–2e shows a lithium niobate attenuator.
Figure 2B:
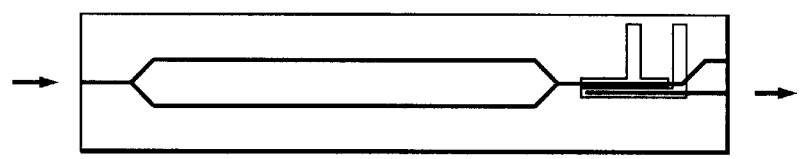
Figure 2C:
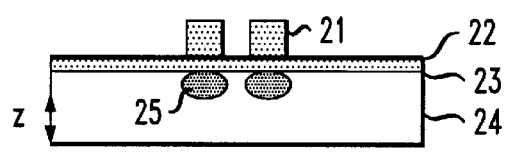
Figure 2D:
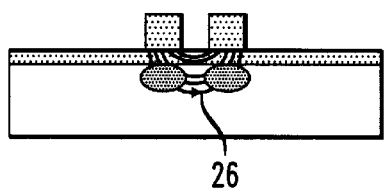
Figure 2E:
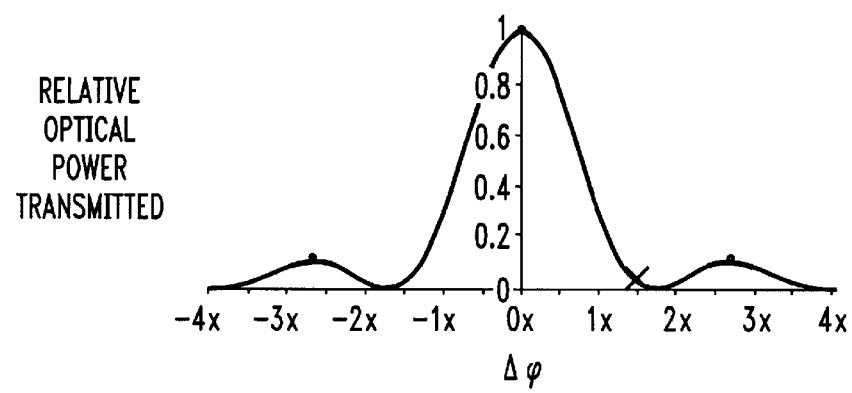

FIG. 2a–2e shows a lithium niobate attenuator. FIG. 2a shows a planar view of the attenuator, with waveguide only. FIG. 2b shows a planar view of the attenuator with waveguides and electrodes. FIG. 2c shows a cross-sectional view of the attenuator, with gold plated electrodes (21), charge dissipation layer (22), buffer layer (23), lithium substrate (24) and optical modes propagating through waveguides (25) illustrated. FIG. 2d shows the electric field distribution (26) through the attenuator when a bias voltage is applied to the electrodes. When light travels through one waveguide, the light can be coupled to light traveling through the other waveguide if the spacing between the waveguides and the refractive indices of the waveguides are properly selected. FIG. 2e shows a graphic representation of output of the attenuator as a function of applied voltage. The operating point, indicated by the "X", is selected so that the desired attenuation of the light is achieved. Typical operating points for lithium niobate attenuators are from about 10 to about 20 volts. In attenuators, the spacing between the waveguides is typically about 3 to 6 times less than the spacing between waveguides in a modulator. Typically, the spacing between the waveguides in an attenuator is less than about 10 microns, preferably about 6 to about 8 microns, for example, about 7 microns. Also, the applied electric field applied to an attenuator is typically about 3 to about 60 times greater than the electric field applied to a modulator.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A method for reducing the pyroelectricity of a non-centric crystal comprising etching the surface of the crystal to a depth of less than about 300 angstroms.

2. The method of claim 1 wherein said crystal comprises a waveguide.

3. The method of claim 1, further comprising depositing a dielectric buffer layer onto said surface.

4. The method of claim 1 wherein the depth of said etching is less than about 275 angstroms.

5. The method of claim 1 wherein the depth of said etching is less than about 250 angstroms.

6. The method of claim 1 wherein the surface of said crystal, following said etching step, has a surface defect density of less than about $5 \times 10^6$ defects per square centimeter.

7. The method of claim 1 wherein the crystal comprises a material selected from the group consisting of lithium niobate, barium titanate, lead titanate, potassium lithium niobate, and calcium niobate.

8. The method of claim 7 wherein the crystal comprises lithium niobate.

9. The method of claim 3 wherein the buffer layer comprises indium oxide.

10. The method of claim 9 wherein the buffer layer comprises a dopant comprising indium oxide in silicon dioxide.

11. An optical device comprising a pyroelectric non-centric crystal having an etched surface for reducing crystal pyroelectricity and a voltage source for applying a bias voltage to said device, wherein the depth of said etching into said surface is less than about 300 angstroms.

12. The device of claim 11 wherein the depth of said etching is less than about 275 angstroms.

13. The device of claim 11 wherein the depth of said etching is less than about 250 angstroms.

14. The device of claim 11 wherein the surface of said crystal has a surface defect density of less than about $5 \times 10^6$ defects per square centimeter.

15. The optical device of claim 11 wherein said bias voltage is variably applied as required to maintain the operation of said optical device.

16. The optical device of claim 11 wherein said bias voltage varies by less than about 1 volt corresponding to a temperature change of about 70° C.

17. The device of claim 11 wherein said bias voltage varies by less than about 0.7 volt.

18. The device of claim 11 wherein said bias voltage varies by less than about 0.5 volt.

19. The optical device of claim 11 further comprising an optical modulator operable to modulate an input light wave according to an input signal at an operating point which is determined by a bias voltage.

20. The optical device of claim 11 further comprising a detector that detects a deviation of said operating point from a selected optimal operating point based on an output of said optical modulator.

21. The device of claim 11 wherein said crystal comprises lithium niobate.

22. The device of claim 11 wherein said crystal further comprises indium oxide.

23. A method of manufacturing an optical device comprising:

providing a non-centric electro-optic crystal;

forming a waveguide in the non-centric electro-optic crystal;

etching the surface of the crystal to a depth of less than about 300 angstroms;

depositing a buffer layer onto the etched surface of the crystal;

forming a charge dissipation layer on the buffer layer; and attaching one or more electrodes to the crystal.

24. The method of claim 23 wherein the depth of said etching is less than about 275 angstroms.

25. The method of claim 23 wherein the depth of said etching is less than about 250 angstroms.

26. The method of claim 23 wherein said buffer layer comprises indium oxide.

27. The method of claim 23 wherein said buffer layer comprises indium oxide-doped silicon dioxide.

28. The method of claim 23 wherein said etched surface has a surface defect density of less than about $5 \times 10^6$ defects per square centimeter.

29. The method of claim 23 wherein said electrodes comprise gold.

30. A method for reducing pyroelectricity of a non-centric crystal comprising the steps of:

forming a waveguide on said crystal; and subsequently etching a surface of the crystal to a depth of less than about 300 angstroms.

* * * * *